Nov. 8, 1960  R. J. VAN DE HEY  2,958,999
GOVERNOR
Filed April 18, 1957
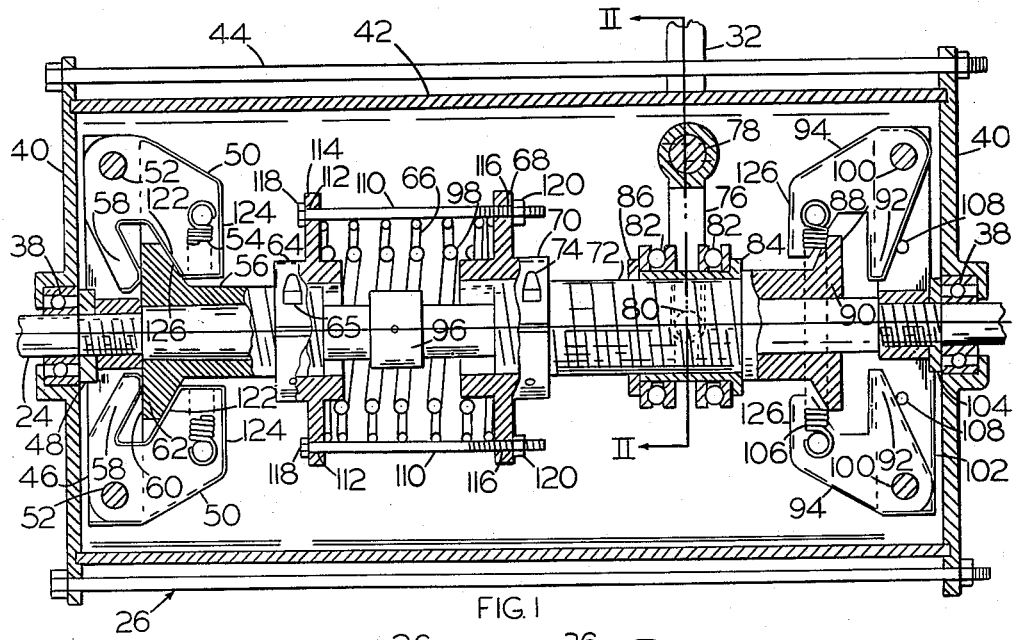
FIG. 1
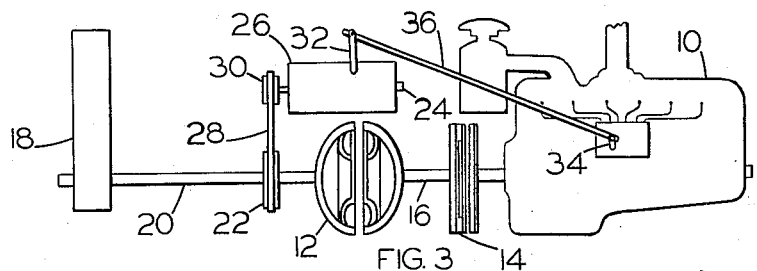
FIG. 3
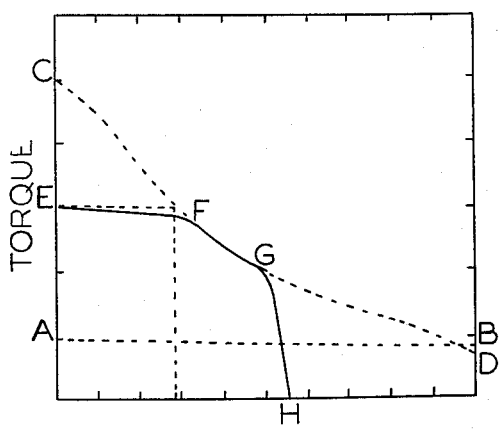
FIG. 2
OUTPUT SPEED IN
% MAX. ENGINE SPEED
FIG. 4
INVENTOR
ROCHE J. VAN DE HEY
BY *Richard E Randolph*
AGENT

United States Patent Office 2,958,999
Patented Nov. 8, 1960

2,958,999

GOVERNOR

Roche J. Van De Hey, Whitelaw, Wis., assignor to Manitowoc Engineering Corp., Manitowoc, Wis., a corporation of Wisconsin Filed Apr. 18, 1957, Ser. No. 653,701

12 Claims. (Cl. 60—12)

This invention relates to a speed and torque limiting governor for controlling an engine driving through a hydraulic torque converter.

One inherent characteristic of such torque converters is the increase of output torque which accompanies a decrease in output shaft speed with respect to input shaft speed whereby engine torque is multiplied by the converter as the output shaft speed is held down under load. Conversely, at light loads, the output shaft speed will approximate the engine speed.

However, it is frequently desirable to operate the output shaft of the torque converter at a lower speed at light loads than the maximum engine speed. For this reason, a governor, responsive to output shaft speed, may be provided to control engine torque to limit the output shaft speed to a desired maximum at light loads. Such a device is known as an output shaft governor.

On the other hand, in certain installations an undesirable condition occurs when the load increases to the point where the torque converter approaches a stalled condition with the engine delivering maximum torque. When this occurs, the torque output from the converter continues to rise to a point where it may damage the driven machine.

While it is possible to design a torque converter wherein stall torque does not exceed a desired limit, such a converter would deliver less work throughout its operating range than would a larger converter capable of exceeding the desired limit. Consequently, a means to limit the torque output of the larger converter would allow advantage to be taken of its more desirable intermediate range.

The governor of the present invention is adapted to control an engine equipped with a torque converter to govern the engine torque to maintain a normal operating speed at the output shaft of the converter under increasing load up to the maximum torque of the engine, to hold the engine at maximum torque as the speed of the output shaft decreases with a further progressive increase in the torque required, and to begin decreasing engine torque when the output shaft speed decreases to a value approaching a predetermined speed corresponding to the maximum desired output shaft torque to limit the converter output torque to said desired maximum.

The principal object of the present invention is to provide a means to limit the torque of an engine driving through a hydraulic torque converter.

Another object of the invention is to provide an output shaft governor with additional governing action to limit the torque output of an engine driving through a hydraulic torque converter.

Other objects and advantages will become apparent from the following detailed description taken in conjunction with the accompanying drawings in which:

Fig. 1 is a vertical section through one embodiment of the invention with the parts in stationary position;

Fig. 2 is a view taken along line II, II of Fig. 1 showing the connection between the governor and the engine throttle linkage;

Fig. 3 is a schematic layout of a typical application of a governor embodying the present invention; and Fig. 4 is a graph showing the relationship between speed and torque in a typical hydraulic torque converter.

As shown in Fig. 3, engine 10 drives torque converter 12 through clutch 14 by means of drive shaft 16. The torque converter drives some mechanism, here simply shown as block 18, through drive shaft 20. Pulley 22 on shaft 20 drives governor shaft 24 rotatably mounted in governor 26 through a belt 28 and a pulley 30 on the governor shaft. The drive to the governor can, of course, be by chain, gears or any other means. Arm 32 transmits governor motion to engine throttle 34 through link 36.

Figure 4 shows a speed-torque curve for a typical three stage torque converter having superimposed thereon a speed-torque curve as controlled by the governor of the present invention. Line AB represents engine torque or torque input to the converter plotted against output shaft speed expressed as percent of the maximum engine speed. Line CD represents torque output from the converter and it will be seen that as the output shaft speed decreases under load, the output shaft torque rises until, at stall, the torque is increased to approximately five times the value of the input torque. While the rising torque characteristic is very desirable, the extreme torque produced at stall will frequently damage the driven machinery. It is necessary, therefore, to limit the maximum torque output to a safe value. This safe value may, for example, be taken as three times engine torque as shown at E on the graph.

In addition, it is sometimes desirable to limit the output shaft to a speed less than that of the maximum engine speed. Such a speed may be controlled by a tail shaft governor and is denoted by point H on the graph.

The curve EFGH represents the speed-torque curve of an engine-converter combination controlled by the governor of the present invention as will be hereinafter more fully described.

Broadly speaking, the invention comprises a pair of speed responsive devices acting in opposite directions on a control member but responsive to different speeds whereby one device operates at high output shaft speed to open the throttle upon a decrease of speed to attain maximum power under load and the other device acts at low output shaft speed to partially close the throttle to prevent the development of excessive torque. The expression "speed responsive device" as used in the specification and claims is intended to include those devices by which a change of speed produces a forceful mechanical movement. Although not so limited, one example of such a device is the simple and well known flyball governor.

The structure mounted on the right hand portion of governor shaft 24 (as viewed in Fig. 1) functions as a governor to maintain a predetermined maximum speed (for example, 1000 r.p m.) and the structure on the left functions as a torque limiting device to override the operation of the governor to reduce fuel to the engine when speed drops below a predetermined lower speed (for example, 500 r.p.m.) due to a stalling load. Fig. 1 shows the parts in their stationary position. The governor shaft can be driven from either end. In order to have a better speed for the governor action it is preferable to operate the governor shaft at a speed of 2 to 2½ times the converter output shaft speed.

Referring to Fig. 1, governor shaft 24 is journaled in bearings 38, 38 in hubs in spaced end plates 40, 40. The ends of cylindrical housing 42 are fitted in aligned circular grooves in the end plates 40, 40 with the parts held by the tie rods 44. As the shaft rotates, H plate 46 (so called because of its resemblance to the letter H)

threaded thereon and held in place by lock nut 48 rotates causing heavy fly-weights 50, 50 pivotally connected to the H plate between the legs thereof by pins 52, 52 to swing outwardly from the shaft under the influence of centrifugal force against the bias of springs 54, 54 which interconnect the weights. As the weights swing out, torque sleeve 56 slidably mounted on the shaft, is moved to the right by fingers 58, 58 on the weights bearing against end surface 60 of peripheral flange 62 on the sleeve. As the sleeve is moved to the right due to the increasing speed, split hub 64, threaded on the sleeve and clamped in position by bolts 65, moves spring 66 and with it flange 68 on hub 70 similarly mounted on governor sleeve 72 by bolts 74. The movement of sleeve 72 is imparted to fork 76 keyed to shaft 78 and engaging the sleeve through pins 80 projecting between thrust bearings 82, 82. Shaft 78 is journaled in cylindrical housing 42 to increase the opening of throttle 34 through arm 32 and link 36 to increase fuel to the engine when rotated counter-clockwise. The thrust bearings 82, 82 are mounted on collar 84 and lock nut 86 threaded on the sleeve.

Governor sleeve 72 can move to the right only until the end surface 88 of peripheral flange 90 contacts fingers 92, 92 of light flyweights 94, 94 such movement being sufficient to fully open the engine throttle. Further movement of torque sleeve 56 will compress spring 66 until sleeve 56 strikes stop collar 96 pinned to the shaft. At approximately the same time governing spring 98 contacts flange 68 on hub 70.

The engine will continue to pick up speed due to the increased throttle setting and as the speed of shaft 24 increases to a point approaching the control speed, light flyweights 94 pivotally mounted on pins 100, 100 to H plate 102 threaded on the shaft and locked by nut 104, will swing out against the bias of springs 106, 98, and 66. The light flyweights, because of their lighter weight, cannot move against the bias of springs 106, at speeds below 500 r.p.m. As light flyweights 94 move out of contact with stop pins 108, 108 fingers 92 will bear against end surface 88 of peripheral flange 90 on governor sleeve 72, to move sleeve 72 to the left to decrease fuel to the engine until equilibrium is reached between the bias of springs 106, 98, and 66 and the centrifugal force acting on the light flyweights to hold the converter tail shaft speed at 1000 r.p.m.

If the load increases, speed will tend to decrease causing the light flyweights to move in toward the shaft allowing the bias of springs 106, 98, and 66 to move governor sleeve 72 toward the right to increase engine fuel. Under normal conditions the increased load is overcome and speed restored to the control point. Conversely, if the load falls off the speed increases and flyweights 94 will move farther out from the shaft causing the governor sleeve to move to the left to decrease fuel and reduce speed to the control point.

If, however, a stalling load is encountered and the increased fuel to the engine caused by the full inward movement of light flyweights 94 is insufficient to overcome the load and the speed continues to decrease to 500 r.p.m., the torque limiting governor mounted on the left portion of the shaft comes into play. Heavy flyweights 50, 50 which have remained in their outermost positions with torque sleeve 56 bearing against stop collar 96 at speeds exceeding 500 r.p.m. will, as speed drops below that point, swing toward the shaft under the bias of springs 54 allowing spring 66 to push torque sleeve 56 back to the left. The initial movement to the left of the torque sleeve under a stalling load will take up the lost motion in the connection between the two sleeve including rods 110, 110 slidably mounted in openings 112, 112 in flange 114 of hub 64 and threaded into aligned openings 116, 116 in flange 68. After heads 118, 118 on rods 110 threaded in flange 68 and locked by nuts 120, 120 make contact with the flange 114 on the hub 64, surface 122 on nose 124 of each heavy weight acts on the sloping portion 126 of peripheral flange 62 to pull torque sleeve 56 and governor sleeve 72 to the left thereby decreasing fuel to the engine to limit the torque input and consequently the torque output of torque converter 12 and thereby prevent damage to the machinery as the speed continues to drop under the stalling load.

Centering spring 66 mounted between the flanges 68 and 114 of the hubs and supported therebetween by rods 110 serves to position hub 70 when the parts are stationary to set the throttle in position where speed will pick up on starting with no load. The speed at which the torque limiting device will function can be adjusted within limits by varying the amount of lost motion between the sleeves by adjusting the position of rods 110 in the threaded openings in flange 68. The desired constant operating speed can be varied by changing the position of stop collar 96 on the shaft to thereby vary the amount of bias exerted on governor sleeve 72 by spring 98 or by varying the force of springs 106 exerted on light flyweights 94.

It will be noted that the torque limiting flyweights 50 engage flange 62 of sleeve 56 constantly whereas the light flyweights have a much greater gap between fingers 92 and nose portions 126 so sleeve 72 is free to be pulled to the left when the torque limiting action takes place.

To review the operation briefly, on starting the engine the centering spring 66 has positioned governor or speed sleeve 72 to position throttle 34 to supply enough fuel to increase the engine speed with no load on the output shaft. As the speed picks up fingers 58 on weights 50 move sleeve 56 to the right. This moves governor sleeve 72 to the right to further increase the fuel until torque sleeve 56 butts against stop 96 and brings spring 98 into contact with hub 70. The increased fuel to the engine causes the engine speed to continue to increase until weights 94 swing out and fingers 92 move the governor sleeve to the left against spring 98 to hold the engine speed at 1000 r.p.m. which corresponds to point H on the curve (Fig. 4). If the load increases the weights 94 will swing in to move the governor sleeve to increase the fuel. If a stalling load is placed on the output shaft the governor will first act to increase the fuel to the maximum (point G). Since the load is a stalling one, the speed will continue to drop and at 500 r.p.m. (point F) the weights 50 start to move in to first relieve governor sleeve 72 of the bias of spring 98 and to then take up the slack in the lost motion connection between the sleeves whereupon the governor sleeve is pulled to the left with the movement of the torque sleeve to cut the fuel supply back to limit the torque to line EF on the curve rather than following line CD. Of course, if the stalling load is removed the speed will pick up as from starting.

It will be noted that in Fig. 4 speed is actually output r.p.m. in percentage of maximum engine r.p.m. Normally, the actual engine r.p.m. will not fall below about 80% of maximum. This will, of course, be modified by the present governor. In connection with the curve of Fig. 4, it should be noted that, while this curve is characteristic of a three stage torque converter, all commercially available torque converters have the rising torque characteristic overcome by the present invention. Therefore, the present invention is not limited to use with a given torque converter.

Although but one embodiment of the present invention has been illustrated and described and various exemplary speeds have been recited, it will be apparent to those skilled in the art that various changes and modifications may be made therein without departing from the spirit of the invention or from the scope of the appended claims.

Having thus described my invention, I claim:

1. A power plant comprising an engine driving a torque converter having an output shaft, a first governor responsive to output shaft speed to increase engine torque upon a decrease of said output shaft speed, and a second governor responsive to output shaft speed to decrease engine torque upon a decrease of said output shaft speed, said first governor being responsive to a higher range of speeds than is said second governor.

2. A power plant comprising an engine having a throttle, a torque converter driven by said engine, said torque converter having an output shaft, a movable control member connected to said throttle, a first output shaft speed responsive device acting on said control member in a direction to move said control member in a throttle opening direction upon a decrease of said output shaft speed, and a second output shaft speed responsive device providing a limited bias on said control member in a direction to move said control member in a throttle opening direction upon an increase of said output shaft speed, said second speed responsive device being responsive to a lower range of speeds than is said first speed responsive device.

3. The power plant of claim 2, in which each of said speed responsive devices comprises a flyweight acting in opposition to a resilient bias.

4. The power plant of claim 3, in which said second speed responsive device acts on the bias of said first speed responsive device in a direction to increase said bias upon an increase of speed.

5. The power plant of claim 2, in which said first and second speed responsive devices act upon opposite sides of said control member.

6. A power plant comprising an engine having a throttle, a torque converter driven by said engine, said torque converter having an output shaft, a movable control member connected to said throttle, a first output shaft speed responsive device acting on said control member in a throttle closing direction upon an increase of said output shaft speed, a second output shaft speed responsive device providing a limited bias on said control member in a throttle opening direction upon an increase of said output shaft speed, said first speed responsive device acting at a higher range of speeds than said second speed responsive device.

7. The power plant of claim 6, in which said second speed responsive device acts on said bias in a direction to reduce said bias prior to acting on said control member in a throttle closing direction.

8. The power plant of claim 7, in which said second speed responsive device acts on said control member through a lost motion connection whereby the amount said bias is reduced is limited.

9. A power plant comprising an engine having a throttle, a torque converter driven by said engine, said torque converter having an output shaft, a movable control member connected to said throttle, a first output shaft speed responsive device acting on said control member in a throttle closing direction upon an increase of said output shaft speed, including a bias urging said control member in a throttle opening direction, a lost motion connection limiting the movement of said bias, and a second output shaft speed responsive device acting on said bias in a direction to decrease said bias upon a decrease of said output shaft speed to the limit of said lost motion connection, said second speed responsive device acting upon a further decrease of speed, on said control member in a throttle closing direction through said lost motion connection, said first speed responsive device being responsive to a higher range of speeds than is said second speed responsive device.

10. The power plant of claim 9, in which said speed responsive devices are mounted on a common shaft.

11. The power plant of claim 9, in which each of said speed responsive devices comprises a plurality of flyballs acting in opposition to a resilient bias.

12. A power plant comprising an engine having a throttle, a torque converter driven by said engine, said torque converter having an output shaft, a shaft driven by said output shaft, a control member connected to said throttle, a first speed responsive device mounted on said shaft acting on said control member in a throttle opening direction upon a decrease of speed and including a spring biasing said control member in a throttle opening direction, a second speed responsive device acting on said spring in a direction to decrease the bias thereof upon a decrease of speed, and a lost motion connection between said second speed responsive device and said control member limiting the amount which said bias can be decreased, whereby said second speed responsive device, upon decreasing speed, first decreases said bias and then moves said control member in a throttle closing direction, said second speed responsive device responding to a lower range of speeds than does said first speed responsive device.

References Cited in the file of this patent
UNITED STATES PATENTS

| | | |
|---|---|---|
| 2,108,970 | McKinney | Feb. 22, 1938 |
| 2,374,434 | Jensen | Apr. 24, 1945 |
| 2,628,470 | Orton | Feb. 17, 1953 |
| 2,670,725 | Cummins | Mar. 2, 1954 |
| 2,721,072 | Zuhn | Oct. 18, 1955 |
| 2,738,650 | McAfee | Mar. 20, 1956 |